United States Patent
Li

(10) Patent No.: US 10,632,524 B2
(45) Date of Patent: Apr. 28, 2020

(54) METHOD FOR PROCESSING PRECISION FORGING OF BEARING RING

(71) Applicant: Shanghai Dianji University, Shanghai (CN)

(72) Inventor: Lei Li, Shanghai (CN)

(73) Assignee: Shanghai Dianji University, Shanghai (CN)

( * ) Notice: Subject to any disclaimer, the term of this patent is extended or adjusted under 35 U.S.C. 154(b) by 67 days.

(21) Appl. No.: 15/989,803

(22) Filed: May 25, 2018

(65) Prior Publication Data

US 2018/0272420 A1   Sep. 27, 2018

Related U.S. Application Data

(63) Continuation of application No. PCT/CN2017/074226, filed on Feb. 21, 2017.

(30) Foreign Application Priority Data

Aug. 12, 2016 (CN) .......................... 2016 1 0662954

(51) Int. Cl.
*B23P 15/00* (2006.01)
*B21K 1/04* (2006.01)
*B21H 1/12* (2006.01)

(52) U.S. Cl.
CPC ................. *B21K 1/04* (2013.01); *B21H 1/12* (2013.01); *B23P 15/003* (2013.01)

(58) Field of Classification Search
CPC  B21K 1/04; B21K 1/05; B23P 15/003; B21H 1/12
See application file for complete search history.

(56) References Cited

U.S. PATENT DOCUMENTS

| 6,620,262 B1* | 9/2003 | Okita ................. B21K 1/04 148/226 |
| 2010/0316323 A1* | 12/2010 | Shibata ................... B21H 1/12 384/589 |
| 2013/0326880 A1* | 12/2013 | Kamamoto ............ F16C 33/64 29/898 |

FOREIGN PATENT DOCUMENTS

| CN | 102248369 | 11/2001 |
| CN | 101648332 | 2/2010 |
| CN | 102489637 | 6/2012 |
| CN | 104493439 | 4/2015 |
| CN | 106270354 | 1/2017 |
| WO | 9855248 | 12/1998 |
| WO | 2012002865 | 1/2012 |

OTHER PUBLICATIONS

Written Opinion corresponding to International Patent No. PCT/CN2017/074226 dated Apr. 26, 2017; 8 pages.
International Search Report corresponding to International Patent No. PCT/CN2017/074226 dated Apr. 26, 2017; 4 pages.

* cited by examiner

*Primary Examiner* — Jun S Yoo
(74) *Attorney, Agent, or Firm* — Leason Ellis LLP

(57) ABSTRACT

A near-net shape forming method for fabricating the precise bearing ring forging is invented. The processing method is composed of following three procedures. (1) the precise ring-like billet with chamfer angle is manufactured by the machining method. (2) The billet is heated by the less oxidation or non-oxidation heating method before ring rolling. (3) The bearing ring forging integrating with the raceway is formed in one pass of the rolling process by the ring rolling method.

5 Claims, 2 Drawing Sheets

$R_1 = (0.1 \sim 0.5) \min(B, H)$ $R_2 = (0.1 \sim 0.5) \min(B, H)$

METHOD FOR PROCESSING PRECISION FORGING OF BEARING RING

TECHNICAL FIELD

Present invention relates to plastic forming, forging, especially a near-net shape forming method of precise bearing ring forging.

BACKGROUND ART

Bearing is one of the most important fundamental part of the kinematic mechanism. Bearing is used for transmitting power, supporting the rotational parts and ensuring the rotating precision. Bearing is widely used in the industries and our daily lives, such as power generating equipment, aircraft, rocket, ship, automobile, train, electrical appliance, etc. Bearing is the key part to maintain normal running of the machine. Generally, a set of bearing is composed of inner ring, outer ring, ball and cage. There is raceway on the inner surface of the outer ring and the outer surface of the inner ring. One function of the raceway is providing the movement track of the ball, and the other function is constraining the movement direction of the ball.

Bearing works in the high speed, high temperature, fluctuating load, friction and vibration environment. Therefore, it is feasible to breakdown because of fatigue failure. Although the shape of bearing is quite simple, its manufacturing precision is very high and extremely long fatigue life is required. Hence, it is one of the most difficult part to be manufactured.

Manufacturing procedure of bearing is multi-steps. Generally, forging is the first step to provide original workpiece for the further processing. If the quality of original workpiece is not well, e.g., machining allowance is too large, grain size is big, forging flowlines are interrupted, not only the processing time becomes long, but also the fatigue life of the bearing will be greatly shortened. Hence, it is very important to provide high-precision, high-quality, fatigue-resistant forging workpiece for further manufacturing long-life bearing.

Traditional fabricating flowchart of the bearing ring forging, especially for the high temperature alloys, is: "saw-cutting blanking→heating→upsetting→punching blind hole→punching through hole→first pass ring rolling→heating→second pass ring rolling→ . . . →machining the raceway". The ellipsis represents the possible additional passes of heating and ring rolling process for high temperature alloys, annealing, shot blasting and acid cleaning procedures. The "saw-cutting blank→heating→upsetting-→punching blind hole→punching through hole" procedure can be collectively called ring-billet making process. The traditional ring forging processing line is long. The dimensional precision of the obtained ring forging is very low and the machining allowance is quite large. Furthermore, the rolling temperature cannot be controlled exactly and the requirement of forming force is relatively large. Especially, for the metals or alloys with high hot strength or low ductility, the forging cannot be formed within one pass of rolling. Generally two or more passes rolling is needed for the metals or alloys with high hot strength or low ductility. More importantly, the raceway cannot be formed integrally in the rolling process, and it is machined after ring rolling, which will cut down the forging flowlines and greatly damage the fatigue life of the bearing. Therefore, a compact near-net forming method of fabricating the anti-fatigue bearing ring forging is anticipated.

SUMMARY OF INVENTION

Technical Problems

Generally, traditional bearing forging process has following drawbacks.

(1) In the saw-cutting blanking process, dimensional precisions of blanks are very poor and the size discrete is very great between different blanks because of bending, swinging and deflection of saw blade in the cutting process. Therefore, machining allowances of bearing ring forging are left very large and lots of materials are machined into waste scraps;

(2) In the punching process, the workpiece suffers from the defects of hole's off-center, corner tearing and shrinking, which lead to the high rejection rate;

(3) In the punching process, punching die need to be continuously cooled by water in order to avoid die softening in high temperature, and the hot workpiece seated in the female die actually immerges in the water because cooling water flows into the female die. Thus, the temperature of the workpiece changes much, and it is greatly different from the original heating temperature. Moreover, the temperature of the workpiece becomes extremely inhomogeneous from the surface to the center of the workpiece. As a result, remarkable thermal stress emerges in the inner of workpiece because large temperature gradient exists in the workpiece because of temperature inhomogeneity resulted from water cooling. Such thermal stress within the workpiece are easy to cause the fracture of the forging in the following punching or rolling process.

(4) Uncontrollability of the actual forging temperature is one of the inherent shortcoming of the traditional bearing ring forging process. In the traditional process, heating procedure must be arranged before the upsetting procedure, and there are two punching procedures before the rolling in the traditional process. Hence, heating procedure is far from the rolling procedure. In addition, the workpiece is immerged into the cooling water that is intentionally used for cooling the punching die. Consequently, the actual rolling temperature is difficult to control because the temperature changes greatly after the upsetting, punching and water cooling processes.

(5) Fishtail-like pit and high burrs are likely to come into being in the rolling process. Such burrs may scratch the ring surface, sometimes they are rolled into the ring surface. Both will destroy the integrity of the ring forging.

(6) The whole production line is too long, and there are one upsetting and two passes of punching procedures for billet making.

(7) For the high temperature alloys, two or more passes heating and rolling procedures are needed, and the deformation of the final pass rolling is too small. Therefore, grain size of the ring forging is coarse because deformation of the final pass rolling is not enough.

(8) For the high temperature alloys, the raceway cannot be formed integrally in the rolling process. The raceway is machined after rolling, and the forging flowlines are cutting off. Hence, the end of the flowline is exposed and the integrity of the part is destroyed. Cutting-off the flowline will result in serious stress corrosion, and the fatigue life of bearing will greatly deteriorate.

The present invention can solve the foregoing drawback of the traditional forming method of the bearing ring forging and provide the near-net shape bearing ring forging. At the same time, related forming method is presented.

Solution to Problems

Present inventors invented a compact near-net shape forming method of the bearing ring forging to overcome above drawbacks of the traditional bearing ring forging process, and to fabricate the near-net shape bearing ring forging.

In present invention, a special ring-like billet with chamfer angle is designed, and it is manufactured by the machining method. The dimensional precision and consistency of different billets can be ensured by the machining method. Furthermore, the upsetting, punching blind hole and punching through hole procedures in traditional billet making step are substituted by the present machining ring-like billet with chamfer angle. Hence, the former processing line of the traditional method is greatly shortened.

Water cooling procedure is also cut down because there is no punching procedure in invented processing method. Therefore, the heated billet with setting temperature will not be cooled by the water. On the other hand, because the upsetting and punching processes are cut down, heating procedure is directly adjoined to ring rolling procedure. When the billet's temperature is heated to the setting rolling temperature, it is directly put into the ring rolling machine for forming. The whole billet's temperature is homogenous and no thermal stress results in before rolling process. Furthermore, the billet rolling temperature can be controlled exactly.

The schematic of cross sectional view of the specially designed ring-like billet with chamfer angle is shown FIG. 2 and FIG. 3. The billet shape is like a ring, where a cylindrical hole is machined in the center of billet. Especially, the two inner edges and the other two outer edges of the billet are chamfered into round or oblique angles, as FIG. 2 and FIG. 3 shown. Supposing that the ring-like billet's width is B and height is H, and the smaller value between the B and H is A=min(B, H), radius of the said chamfered round angle ranges from 0.1A to 0.5A. If the chamfered angle is oblique angle, the length of one side of the said oblique angle $L_1$ ranges from 0.1B to 0.5B, and the length of the other side $L_2$ ranges from 0.1H to 0.5H.

The machined ring-like billet with chamfer angle are used as initial workpiece. The intentionally designed chamfer angle can circumvents the forming of fishtail-like pit and high burrs in the rolling process according to the principle of the minimum resistance force. Furthermore, billet with chamfer angle will greatly decrease the forming resistance because the contact area with the roller is reduced comparing to the billet with right corner.

The ring-like billet is heated by less oxidation or non-oxidation heating method before rolling. The less oxidation means that the oxidation layer on the surface of the billet after the heating is very thin, generally, no more than 0.5 mm. Non-oxidation means that there is no obvious oxidation layer on the surface of the billet after heating, generally, no more than 0.1 mm. The less oxidation or non-oxidation method can be fast electromagnetic induction heating method, protective atmosphere heating method, protective coating heating method or vacuum heating method. Because the less oxidation or non-oxidation heating method is adopted, the loss of the mass and the decarburized layer of billet is very small, and the precise forming can be realized.

The raceway is formed integrally in a single pass of ring rolling process, even for the high hot strength alloys. Because the raceway is formed within the rolling process, the forging flowline is continuous and intact, which will greatly benefit to the bearing fatigue life. Comparing with the traditional forging method, the grain size of invention method becomes extremely smaller because the whole deformation is finished within a single pass of rolling, which will also contribute to the fatigue strength of bearing.

With the invented processing method, drawbacks of traditional forming method of bearing ring forging are all overcome. The near-net shape, anti-fatigue bearing ring forging can be fabricated.

Advantageous Effects of Invention

According to the processing method of the present invention, not only the near-net shape forming of the bearing ring forging can be realized, but also the processing procedures are greatly shortened comparing with the traditional method. Furthermore, the long life, anti-fatigue bearing ring forging can be fabricated.

Because the upsetting, punching blind-hole and punching through-hole procedures are cut down, the defects of the hole off-center and the corner fracture during the punching process are circumvented. The specially designed chamfer angle of the ring-like billet circumvents the forming of fishtail-like pit and high burrs. Moreover, billet with chamfer angle will greatly decrease the forming resistance. Uncontrollability of the actual rolling temperature in traditional processing method is overcome. The rolling temperature can be exactly controlled because the heating procedure is adjacent to the ring rolling procedure in our invented method, and the water cooling procedure in traditional processing method is cut down in present invention. The bearing ring forging integrating with the raceway can be formed within only a single pass of rolling. The forging flowline is continuous and intact, which will greatly benefit to the bearing fatigue life. Comparing with the traditional forging method, the grain size of invention method becomes smaller because the whole deformation can be finished within one rolling pass, which will also contribute to the fatigue life of bearing.

DESCRIPTION OF EMBODIMENTS

Hereinafter, the embodiment of the present invention will be described with the reference to figures.

Figure 1:
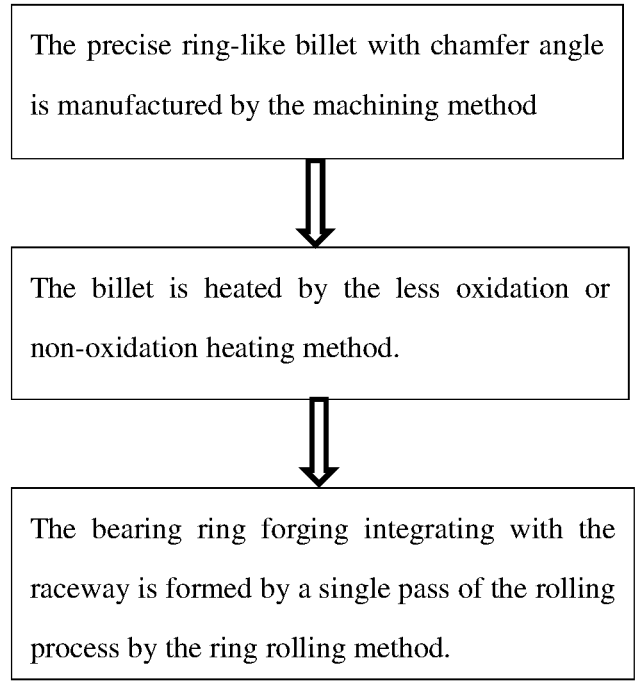
FIG. 1 a flowchart showing the invented compact near-net shape forming method of the bearing ring forging
Figure 2:
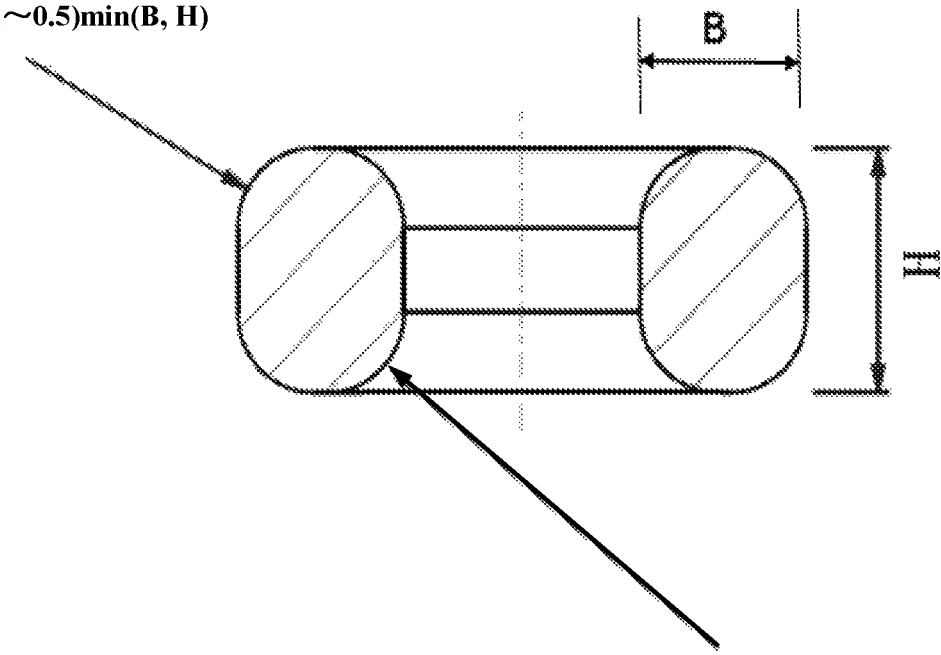
FIG. 2 is a schematic cross sectional view showing the parameters of the ring-like billet with chamfered round angle
Figure 3:
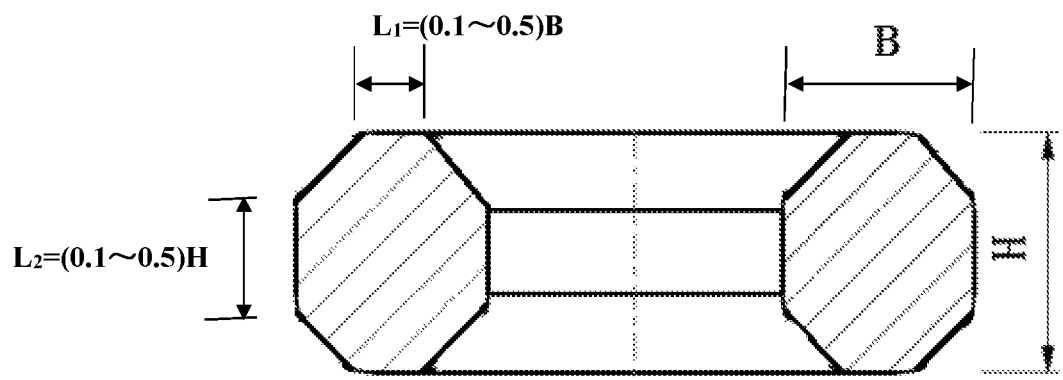
FIG. 3 is a schematic cross sectional view showing the parameters of the ring-like billet with chamfered oblique angle

The invented compact near-net shape forming method of bearing ring forging includes machining the billet with chamfer angle, as FIG. 2 and FIG. 3 shown, heating the billet with less oxidation or non-oxidation method and ring rolling integrally with raceway together by the ring rolling machine.

Further, the machining method of manufacturing the billet with chamfer angle can be drilling, turning, milling or wire-electrode cutting method, or any combination of the above machining methods. The computer numerical control (CNC) machining center is recommended for manufacturing the ring-like billet with chamfer angle in order to obtain the high precision billet. This simple machining procedure can substitute the procedures "upsetting→punching blind-hole→punching through-hole" in the traditional forming method of ring forging. Hence, the processing line is greatly shortened. More importantly, dimensional consistency of the different billet can be ensured. The defects of the hole off-center, corner fracture and shrinking in traditional punching procedure are circumvented. High precision and high quality ring-like billet with chamfer angle is machined, which greatly improve the rate of finished products.

In the method of fabricating near-net shape bearing ring forging, referring to FIG. 2 and FIG. 3, the ring-like billet with chamfer angle is a specially designed billet whose shape is like a ring, where a cylindrical hole is machined in the center of billet. Especially, the two inner edges and the other two outer edges of the billet are chamfered into round or oblique angles, as FIG. 2 and FIG. 3 shown. Supposing that the ring-like billet's width is B and height is H, and the smaller value between the B and H is A=min(B, H), radius of the said chamfered round angle ranges from 0.1A to 0.5A. If the chamfered angle is oblique angle, the length of one side of the said oblique angle $L_1$ ranges from 0.1B to 0.5B, and the length of the other side $L_2$ ranges from 0.1H to 0.5H. Adopting the above specially designed ring-like billet, the contact area between the billet and the roller are sharply decreased. Therefore, the mold filling resistance are greatly reduced. More importantly, burrs and fishtail-like defects are circumvented because the chamfered angle forms into corner gradually in the rolling process.

In the method of fabricating near-net shape bearing ring forging, the ring-like billet is heated by less oxidation or non-oxidation heating method before rolling. The less oxidation or non-oxidation method can be fast electromagnetic induction heating method, protective atmosphere heating method, protective coating heating method or vacuum heating method. Further, the protective atmosphere can be the insert gases, such as Nitrogen and Argon, or mixed gases of the insert gases and the oxygen-exhausted ones, such as $H_2$, CO, methane ($CH_4$), ethane ($C_2H_6$) or propane ($C_3H_8$). For the protective coating heating method, the protective layer, such as glass powder or ceramics one, is painted on the surface of the ring-like billet firstly, then the billets are heated to the rolling temperature by heating furnace. For the vacuum heating method, the air is pumped out from the furnace chamfer before heating in order to completely prevent the billets from oxidation. The fast electromagnetic induction heating method is mainly used in the situation that the billet's outer radius is less than 150 mm. Because the less oxidation or non-oxidation heating method is adopted, the loss of the mass and the decarburized layer is very small, and the precise forming can be realized.

In the method of fabricating near-net shape bearing ring forging, the ring rolling process is performed on the ring rolling machine. The ring rolling machine can be vertical or horizontal ring rolling machine. In order to control the precision, the computer numerical control(CNC) ring rolling machine is recommended. The raceway is integrally formed in the rolling process even for the high temperature alloys.

EXAMPLE

Example 1

A bearing inner ring forging is fabricated. The material is high temperature bearing steel ANSI M50. A ring-like billet, with outer radius 108.5 mm, height H=42.8 mm and width B=30.8 mm, is designed and then machined with the CNC machining center. Radius of the chamfered round angle is designed as 13 mm. The billets are heated to 1120° C. by Nitrogen protective heating method. Then the D51-300 type ring rolling machine is used for fabricating the inner ring forging. The bearing ring forging is precisely formed integrally with the raceway within one pass rolling process. The machining allowance of produced bearing ring forging is only 1.5 mm, however, it is 4.0 mm with the traditional processing method.

Example 2

A bearing inner ring forging is fabricated. The material is high temperature bearing steel ANSI M50. A ring-like billet, with outer radius 108.5 mm, height H=42.8 mm and width B=30.8 mm, is designed and then machined with the CNC machining center. One radius of the chamfered round angle is 10 mm, the other radius of the chamfered round angle is 15 mm. The billets are heated to 1120° C. by vacuum heating method. Then the D51-300 type ring rolling machine is used for fabricating the inner ring forging. The bearing ring forging is precisely formed integrally with the raceway within one pass rolling process. The machining allowance is only 1.2 mm, however, it is 4.0 mm in the traditional processing method.

Example 3

A bearing outer ring forging is fabricated. The material is high temperature bearing steel ANSI M50. The ring-like billet, with outer radius of 122.2 mm, height H=43 mm and width B=34.5 mm, is designed and then machined with the CNC machining center. Radius of the chamfered round angle is 14 mm. The billets are heated to 1120° C. by protective gas heating method where the nitrogen mixed with $H_2$ gases are used. Then the D51-350 type ring rolling machine is used for fabricating the outer ring forging. The bearing ring forging is precisely formed integrally with the raceway within one pass rolling process. The machining allowance is only 1.5 mm, however, it is 4.5 mm in the traditional processing method.

The embodiments and examples disclosed herein are illustrative and non-restrictive in any respect. The scope of the present invention is defined by the terms of the claims, rather than the embodiments described above, and is intended to include any modifications within the scope and meaning equivalent to the terms of the claims.

INDUSTRIAL APPLICABILITY

The method of fabricating bearing ring forging in the present invention can be applied to manufacture the anti-fatigue, long life bearing ring, especially for the high temperature steel or low elongation one. The processing line is greatly shortened and the processing cost is sharply decreased.

The invention claimed is:
1. A method for fabricating a near-net shape bearing ring forging, the method consisting essentially of:
 (1) manufacturing a ring-like billet with at least one chamfer by a machining method,
 (2) heating the ring-like billet manufactured by step (1) by a low oxidation or non-oxidation heating method before rolling, and

(3) forming the near-net shape bearing ring forging with a raceway within a single pass of a rolling process by a ring rolling method.

2. The method according to claim 1, wherein the machining method comprises turning, drilling, milling wire-electrode cutting method, or combinations thereof.

3. The method according to claim 1, wherein the ring-like billet comprises a cylindrical hole at its center, wherein the ring-like billet has two inner edges and two outer edges chamfered into round or oblique angles, wherein if the chamfer is a round chamfer, the radius of the round chamfer ranges from 0.1A to 0.5A, wherein if the chamfer is an oblique chamfer, the length of one side of the oblique chamfer has a first side with a length ranging from 0.1B to 0.5B, and a second side with a length ranging from 0.1H to 0.5H, wherein B and H are the ring-like billet's width and height, respectively, and wherein the smaller value between B and H is A=min(B, H).

4. The method according to claim 1, wherein the low oxidation or non-oxidation heating method comprises protective atmosphere heating, protective coating heating, vacuum heating, fast electro-magnetic induction heating or combinations thereof.

5. The method according to claim 1, wherein the bearing ring forging with the raceway is formed within a single pass of the rolling process by a ring rolling machine.

* * * * *